United States Patent
Argumedo et al.

(10) Patent No.: US 7,349,181 B2
(45) Date of Patent: Mar. 25, 2008

(54) ROTATABLE TAPE GUIDE WITH TAPERED FLANGES

(75) Inventors: Armando Jesus Argumedo, Tucson, AZ (US); Kevin Bruce Judd, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 402 days.

(21) Appl. No.: 11/231,659

(22) Filed: Sep. 21, 2005

(65) Prior Publication Data
US 2007/0064338 A1    Mar. 22, 2007

(51) Int. Cl.
*G11B 15/60*    (2006.01)

(52) U.S. Cl. .................................. 360/130.21

(58) Field of Classification Search ........... 360/130.2, 360/130.21, 130.22, 130.23, 130.24, 90
See application file for complete search history.

(56) References Cited

U.S. PATENT DOCUMENTS

| | | | |
|---|---|---|---|
| 4,441,133 A | 4/1984 | Ogawa et al. | 360/130.22 |
| 4,875,127 A * | 10/1989 | McClure | 360/130.21 |
| 5,188,272 A | 2/1993 | Kanbe et al. | 226/190 |
| 5,407,117 A | 4/1995 | Yokoo et al. | 226/190 |
| 5,447,278 A * | 9/1995 | Lalouette et al. | 242/335 |
| 5,501,386 A | 3/1996 | Kobayashi | 226/190 |
| 5,542,593 A * | 8/1996 | Skaar et al. | 242/615.4 |
| 6,550,658 B2 * | 4/2003 | Fraberger | 226/193 |
| 6,570,740 B1 * | 5/2003 | Anderson et al. | 360/130.21 |
| 6,873,495 B2 * | 3/2005 | Dinhobl | 360/130.21 |

FOREIGN PATENT DOCUMENTS

| JP | 05151666 | * | 6/1993 |
|---|---|---|---|
| JP | 9265696 A | | 10/1997 |

* cited by examiner

*Primary Examiner*—Angel Castro
(74) *Attorney, Agent, or Firm*—John H. Holcombe

(57) ABSTRACT

A rotatable tape guide with a cylindrical barrel having a cylindrical peripheral surface; and a guide flange substantially at each outer side of the cylindrical barrel and having a frusto-conical surface. The frusto-conical surface is configured at a taper angle outward with respect to the perpendicular direction from the cylindrical surface; the taper angle of the guide flange substantially at an angle such that the angle at which a tapered tangential line extends from the circumference of the cylindrical peripheral surface of the cylindrical barrel and along the taper of the guide flange, to the maximum periphery of the frusto-conical surface, is at the maximum potential angle of attack from a magnetic tape at a supply reel with respect to the guide flange.

12 Claims, 4 Drawing Sheets

ROTATABLE TAPE GUIDE WITH TAPERED FLANGES

FIELD OF THE INVENTION

This invention relates to tape guides for controlling the lateral positioning of magnetic tape as it moves longitudinally along a tape path.

BACKGROUND OF THE INVENTION

Typically, tape guides are needed to control the lateral movement of magnetic tape as it is moved longitudinally along a tape path. A tape path for a magnetic tape extends longitudinally between tape reels and across a magnetic tape head which is configured to read and/or write magnetic signals with respect to the magnetic tape.

The magnetic tape may be laterally misaligned with respect to the magnetic tape head as it is fed from a tape reel, and a function of a tape guide is to bring the magnetic tape into alignment. The variation of the magnetic tape in the lateral or transverse direction may be considered the angle of attack from the supply reel with respect to the tape guide.

Tape guides may have flanges at either side of the magnetic tape to provide a force against the side of a misaligned magnetic tape, the force tending to align the magnetic tape. In one example, the flanges may be stationary flanges, in which case the magnetic tape slides along the flanges, the edges potentially cutting into the flanges at the maximum angle of attack of the magnetic tape, and potentially frictionally and mechanically damaging the magnetic tape.

Tape guides may alternatively comprise roller guides in which the rolling action of the tape guide about its rotational axis tends to center the magnetic tape, and may have annular flat flanges that are perpendicular to the axis of rotation. The fact that the magnetic tape entering the tape guide may be axially misaligned creates the opportunity for an edge of the magnetic tape to be forced against one of the flanges, and potentially to impact the shoulder at the top or leading edge of the flange. This may result in a mechanical "working" of the edge of the magnetic tape which may result in the edge becoming buckled or "rolled". Further, the tape edge to roller guide condition may fatigue the tape edge and result in permanent deformation of the magnetic tape, cracking and de-lamination of the magnetic coating of the tape/media structure, and/or the generation and deposition of media products "debris" onto the tape guide flange. Debris contamination on the flange has the potential to introduce a transient lateral motion to the magnetic tape as the magnetic tape edge contacts the contaminant. The transient lateral motion may be sufficiently great that the track following capability of the tape servo system of the magnetic tape head of the tape drive is exceeded.

SUMMARY OF THE INVENTION

A rotatable tape guide, tape translation system, magnetic tape head system, and magnetic tape drive system are provided which, in various embodiments, employ a rotatable tape guide that is configured for translation of magnetic tape between a supply reel and the tape guide.

In one embodiment, the tape guide comprises a cylindrical barrel having a cylindrical peripheral surface; and a guide flange substantially at each outer side of the cylindrical barrel and having a frusto-conical surface, the frusto-conical surface configured at a taper angle outward with respect to the perpendicular direction from the cylindrical surface; the taper angle of the guide flange substantially at an angle such that the angle at which a tapered tangential line extends from the circumference of the cylindrical peripheral surface of the cylindrical barrel and along the taper of the guide flange, to the maximum periphery of the frusto-conical surface, is at the maximum potential angle of attack from a magnetic tape at the supply reel with respect to the guide flange.

In a further embodiment, the taper angle of the guide flange is determined in accordance with the formula "$\Theta = \arctan(H/(r_f - r))$", where:

$H = h \tan(\beta)$;

$r_f$ = radius of the guide flange;

$r$ = radius of the cylindrical peripheral surface of the cylindrical barrel;

$h$ = length of the tapered tangential line; and $\beta$ = the maximum angle of attack from the supply reel with respect to the guide flange.

In another embodiment, the taper angle of the guide flange is substantially between 1 degree and 2 degrees from the perpendicular direction.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
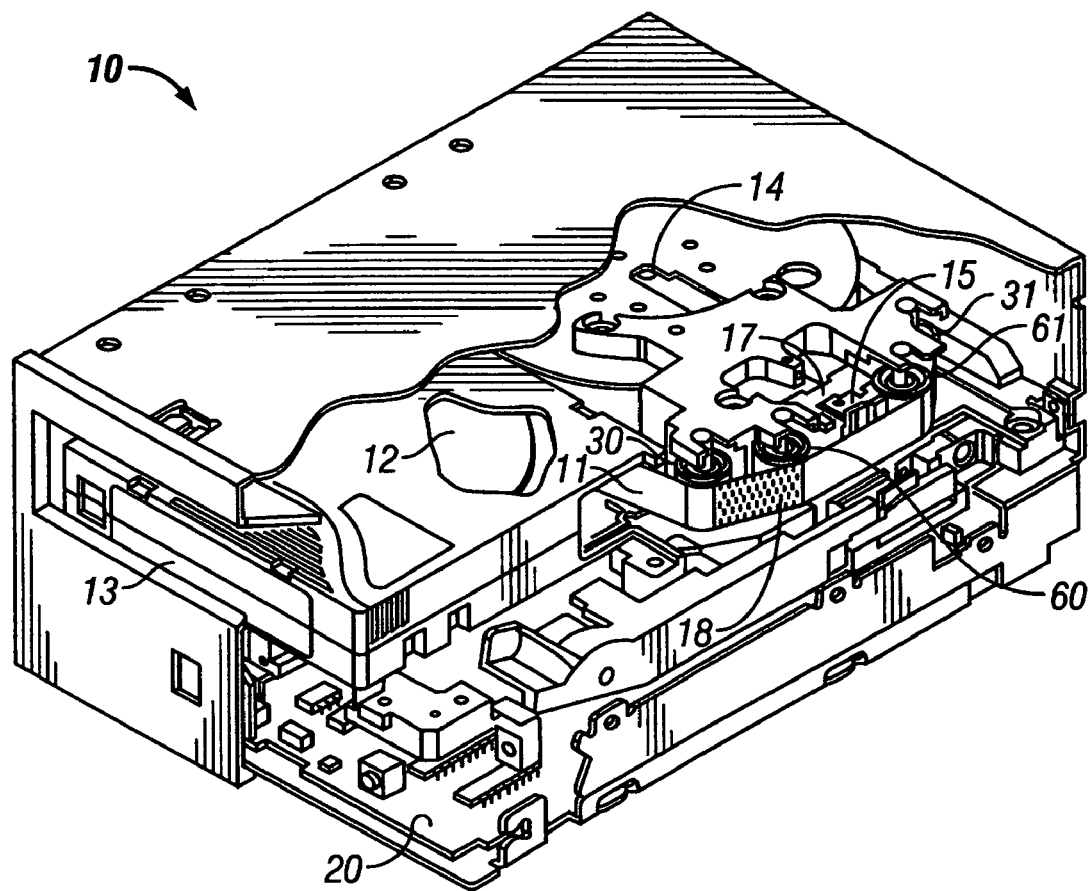
FIG. 1 is a partially cut away view of a magnetic tape drive implementing the present invention.
Figure 3:
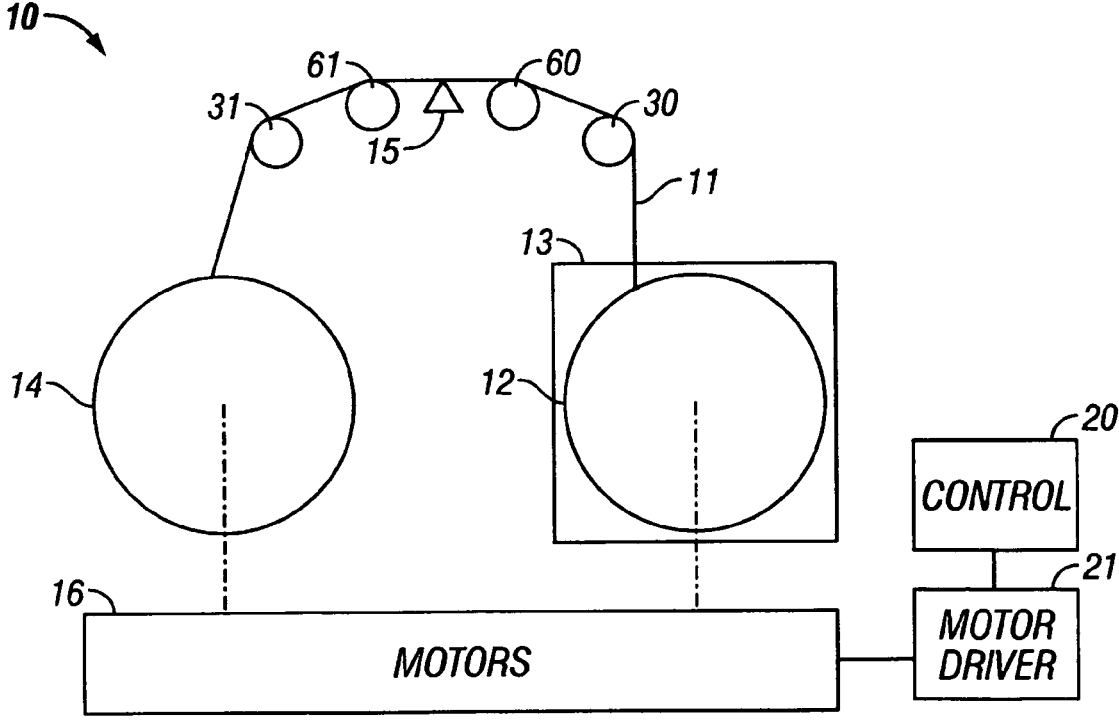
FIG. 3 is a diagrammatic illustration of the magnetic tape drive of FIG. 1.

Referring to FIGS. 1 and 3, a magnetic tape drive is illustrated which implements the present invention. A magnetic tape 11 is translated along a tape path in a longitudinal direction of the tape from a supply reel 12 in a tape cartridge 13 to a take up reel 14, the reels comprising drive reels of a tape drive system which are operated by drive motors 16. The magnetic tape 11 is moved in the longitudinal direction across a tape head 15. The tape head may be supported and laterally moved by an actuator 17 of a track following servo system.

The magnetic tape head 15 may comprise a plurality of read and write elements for reading and writing data with respect to the magnetic tape 11, and may have a servo sensor for sensing servo tracks or bands 18 recorded on the magnetic tape. The servo sensor may sense the lateral position of the magnetic tape and operate the servo system actuator to track follow the servo tracks or bands. The servo sensor may also detect the longitudinal position of the tape from the servo tracks or bands. The tape drive 10 additionally comprises a controller 20 which provides the electronics modules and processor to operate the tape drive, and a motor driver 21 to operate the drive motors 16.

The arrangement of the tape reels 12 and 14 is typically such that the tape reels are in the same plane, and in the same plane as the magnetic tape head 15. However, the tape may be biased to one side or the other of the supply reel, and thus presents an angle of attack that is offline. Thus, tape guides 30, 31, 60 and 61 comprise a tape translation system to control the lateral movement of magnetic tape 11 as it is moved longitudinally along a tape path, and to align the magnetic tape with the magnetic tape head.

Figure 2:
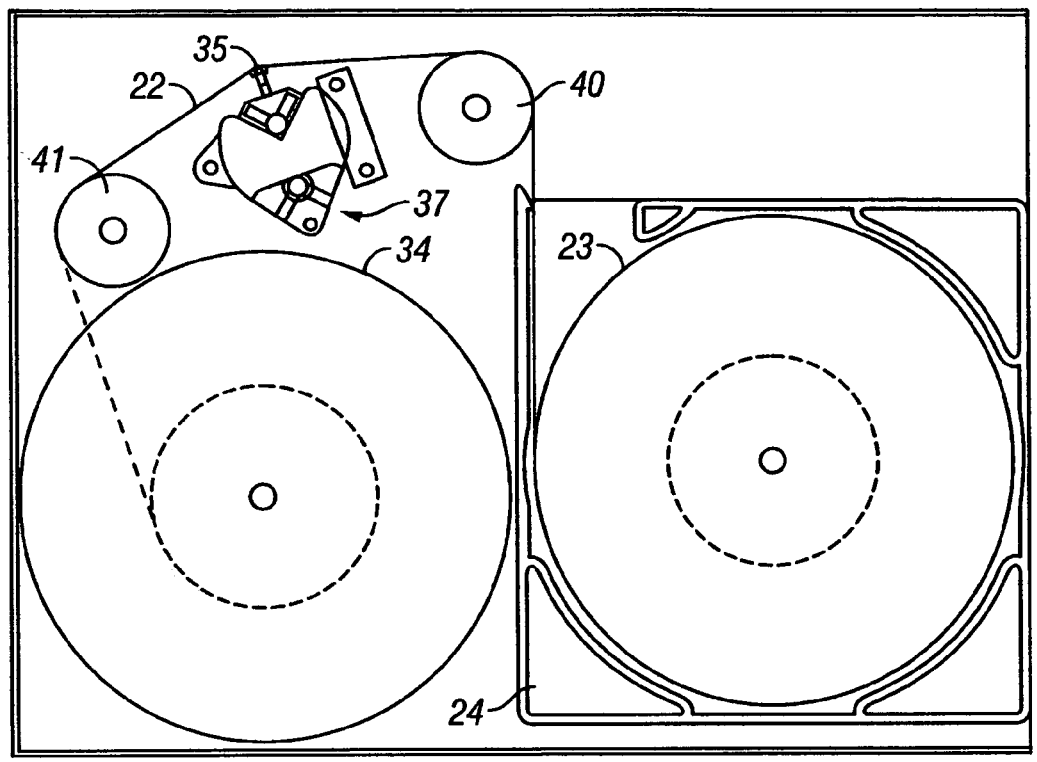
FIG. 2 is a diagrammatic illustration of an alternative magnetic tape drive implementing the present invention.

An alternative type of tape drive 33 is illustrated in FIG. 2, which also implements the present invention. A magnetic tape 22 is translated along a tape path in a longitudinal direction of the tape from a supply reel 23 in a tape cartridge 24 to a take up reel 34, the reels comprising drive reels of a tape drive system which are operated by drive motors. The magnetic tape 22 is moved in the longitudinal direction across a tape head 35 of a tape head assembly 37. The tape head 35, for example, a magnetic tape head, may comprise one or more read and write elements for reading and writing data with respect to the magnetic tape. The tape drive 33 additionally comprises a controller which provides the electronics modules and processor to operate the tape drive.

Tape guides 40 and 41 control the lateral movement of magnetic tape as it is moved longitudinally along a tape path.

The arrangement of the tape reels 23 and 34 is also typical and such that the tape reels are in the same plane, and in the same plane as the magnetic tape head 35. However, the tape may be biased to one side or the other of the supply reel, and thus presents an angle of attack that is offline. Thus, tape guides 40 and 41 comprise a tape translation system to control the lateral movement of magnetic tape 22 as it is moved longitudinally along the tape path, and to align the magnetic tape with the magnetic tape head.

An example of a magnetic tape drive that may implement the present invention is the 3580 Ultrium magnetic tape drive of the International Business Machines Corporation.

Figure 4A:
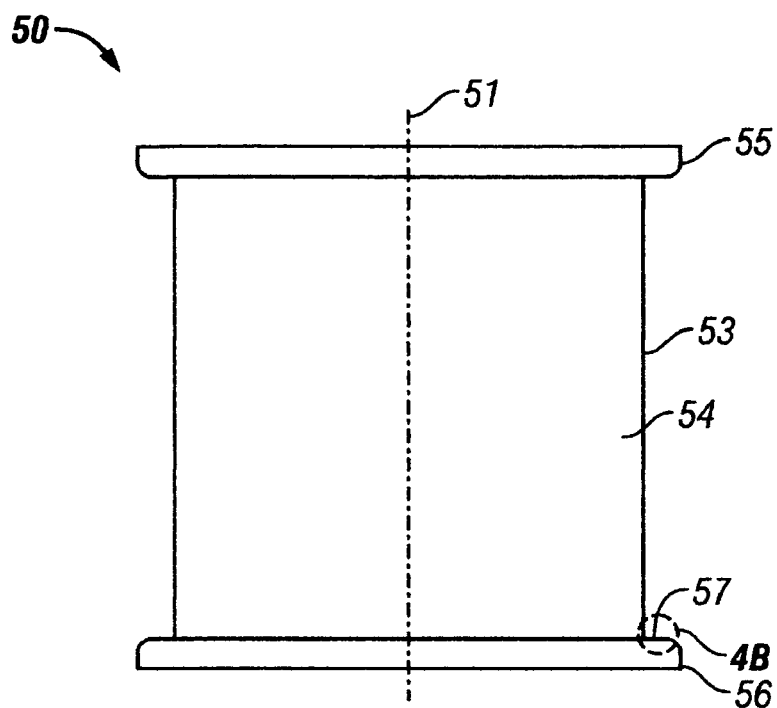
FIG. 4A is an isometric view of a magnetic tape guide in accordance with the present invention, which may be employed in the magnetic tape drives of FIGS. 1 and 2.
Figure 4B:
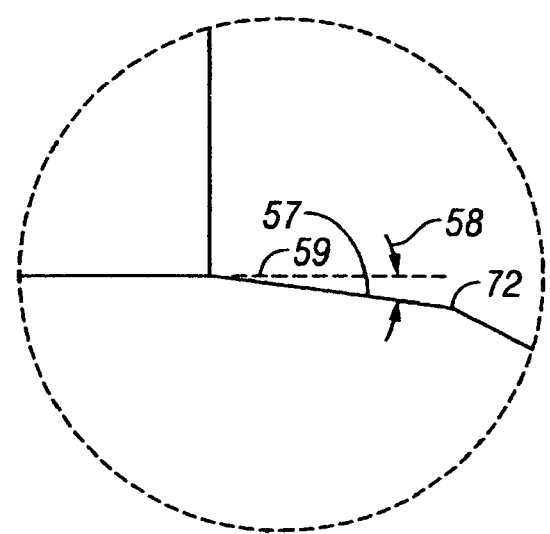
FIG. 4B is an expanded view of the flange of the magnetic tape guide of FIG. 4A.

Referring to FIGS. 4A and 4B, a tape guide 50 is configured for rotation about a central axis 51, as is known to one of skill in the art, for example, for rotation about a central post with roller or ball bearings. The tape guide has a cylindrical barrel 53 with a cylindrical peripheral surface 54 parallel to the central axis. The cylindrical barrel rotates as a magnetic tape is moved longitudinally and the rolling action of the cylindrical barrel tends to center the magnetic tape, aligning the magnetic tape.

In accordance with the present invention, guide flanges 55, 56 are provided at each outer side of the cylindrical barrel 53 having a tape guide configuration geometry which tends to eliminate the condition where the magnetic tape is contacted by the flange surface prior to the magnetic tape wrapping onto the tape guide barrel. This configuration orients the flange surface, e.g. flange surface 57, such that it is nearly parallel to the incoming tape edge when the tape edge is offset laterally. The result is that the tape edge enters the tape guide roller without hitting any flange feature prior to the tape contacting the tape guide roller barrel 53.

The tape guide flanges 55, 56 have a frusto-conical surface 57 configured at a taper angle 58 outward with respect to the perpendicular direction 59 from the cylindrical surface.

Figure 5:
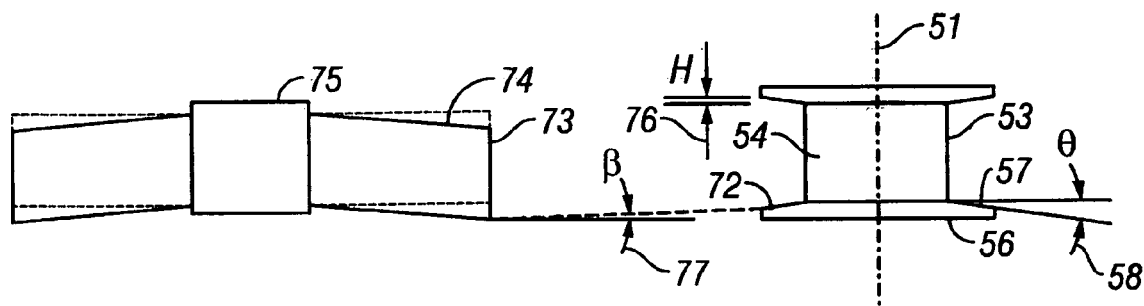
FIGS. 5 and 6 are exaggerated diagrammatic illustrations of a supply reel and a magnetic tape guide of FIGS. 4A and 4B in accordance with the present invention depicting the dimensions of the characteristics employed to determine the angle of the flange of the magnetic tape guide.
Figure 6:
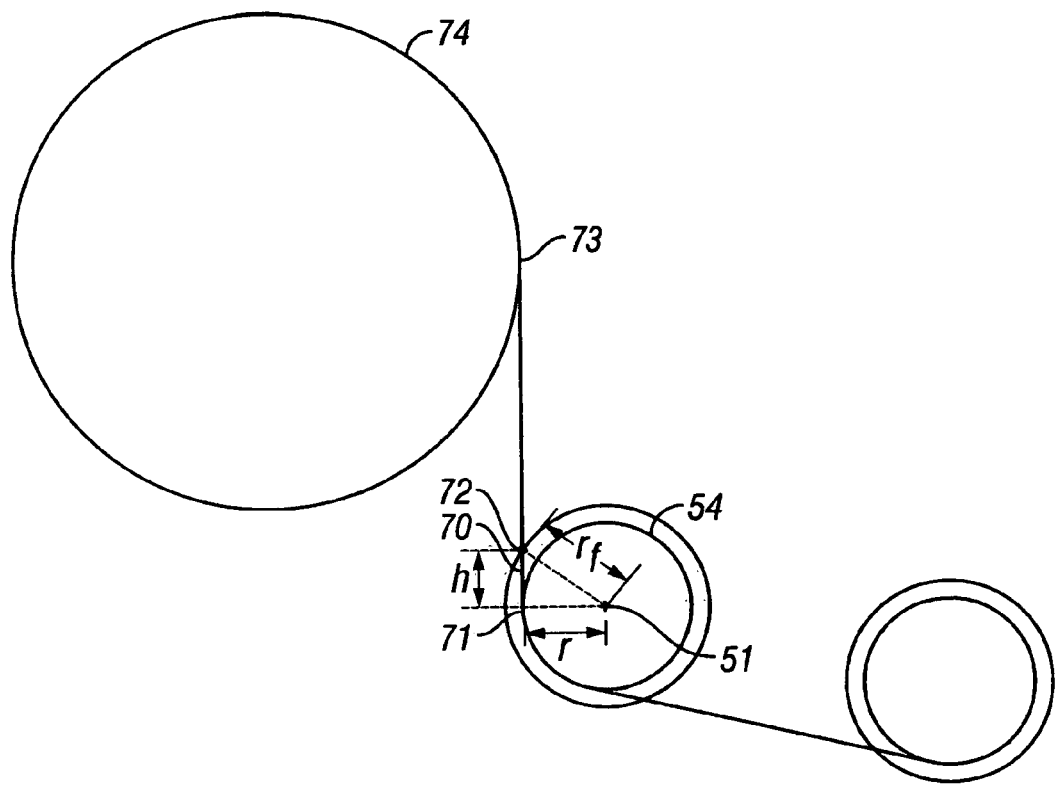

Referring additionally to FIGS. 5 and 6, the taper angle "Θ" 58 of the surface 57 of guide flange 56 is substantially at an angle such that the angle at which a tapered tangential line "h" 70 extends from the circumference 71 of the cylindrical peripheral surface 54 of the cylindrical barrel 53 and along the taper of the guide flange, to the maximum periphery 72 of the frusto-conical surface 57, is at the maximum angle of attack "β" 77 from a magnetic tape 73 at a supply reel 75 with respect to the guide flange 56.

The apex of the conical surface 57 is coincident with the central axis of rotation 51 of the tape guide. The conical surface sense is such that the axial distance from the top flange cone to the bottom flange cone increases with radial position from the guide's central axis.

The flange taper angle "Θ" 58 accommodates the expected worst case scenario comprising the maximum lateral offset of the tape edge from the tape's supplying source to the desired tape path plane, which is the nominal lateral position for the tape as it traverses the magnetic tape head. The lateral offset of the tape edge is called "stack shift" or "tape scatter" which may occur when the tape is wound onto the supply reel.

FIGS. 5 and 6 illustrate the formula for determining the flange taper angle "Θ" 58.

The formula comprises:

"Θ=arctan $(H/(r_f-r))$", where:     1.

H=h tan (β);

$r_f$=radius of the guide flange from the central axis 51 to the periphery 72 of the frusto-conical surface 57;

r=radius of the cylindrical peripheral surface 54, 71 of the cylindrical barrel;

h=length of the tapered tangential line; and

β=the maximum angle of attack from the supply reel with respect to the guide flange.

The length of the tapered tangential line "h" 70 may be determined according to the formula:

h=square root of $(r_f^2-r^2)$.

"H" 76 is the distance in the axial direction from the intersection of the circumference 71 of the cylindrical peripheral surface 54 of the cylindrical barrel 53 with the tapered tangential line "h" 70, to the maximum periphery 72 of the frusto-conical surface 57.

Further in accordance with the present invention, the flange taper angle "Θ" 58 results in the situation where, in the worst case scenario, the magnetic tape edge will contact the flange surface 57 in a co-linear orientation, such that the tape edge to flange contact is ideally a line contact.

Typically, during operation of the magnetic tape drive, the worst case condition maximum is only possible when the magnetic tape reel is full. This is because, as the magnetic tape is unwound from the reel, the diameter of the magnetic tape pack 74 is decreasing, and therefore, the distance from the pack to the tape guide is increasing. Further, flanges (not shown) of the magnetic tape reel 75 may be tapered outwardly, reducing the angle of attack to the guide as the magnetic tape is unwound from the reel. The result is that the potential worst case scenario angle of attack is maximum for a full reel and diminishes as the magnetic tape is unwound from the reel.

Further in accordance with the present invention, the flange taper angle should be close to the taper angle "Θ" 58 as dictated by the formula, so as to reduce the possibility for the magnetic tape to move transversely, should it be biased toward the flange by, for example, "pack shifts" or extreme "scatter wraps". Given that reasonable fabrication and assembly tolerances are required for the magnetic tape guide and the magnetic tape supply reel, a 1 degree positive range may be added to the predicted ideal derived from the ideal maximum expected magnetic tape angle of attack. The result is a taper angle "Θ" 58 of the guide flange of substantially between 1 degree and 2 degrees from the perpendicular direction.

Those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A rotatable tape guide configured for rotation about a central axis, said tape guide comprising:
   a cylindrical barrel having a cylindrical peripheral surface parallel to said central axis; and
   guide flanges substantially at each outer side of said cylindrical barrel and having a frusto-conical surface, said frusto-conical surface configured at a taper angle outward with respect to the perpendicular direction from said cylindrical surface; said taper angle of said guide flange substantially at an angle such that the angle at which a tapered tangential line extends from the circumference of said cylindrical peripheral surface of said cylindrical barrel and along the taper of said guide flange, to the maximum periphery of said frusto-conical surface, is at the maximum potential angle of attack from a magnetic tape at a supply reel with respect to said guide flange.

2. The tape guide of claim 1, wherein said taper angle of said guide flange is determined in accordance with the formula "arctan($H/(r_f-r)$)", where:
   $H = h \tan(\beta)$;
   $r_f$ = radius of said guide flange;
   $r$ = radius of said cylindrical peripheral surface of said cylindrical barrel;
   $h$ = length of said tapered tangential line; and
   $\beta$ = said maximum angle of attack from said supply reel with respect to said guide flange.

3. The tape guide of claim 1, wherein said taper angle of said guide flange is substantially between 1 degree and 2 degrees from said perpendicular direction.

4. A tape translation system configured to control movement of a magnetic tape in a longitudinal direction of said magnetic tape, comprising:
   a plurality of rotatable tape guides positioned in said longitudinal direction of said magnetic tape, at least an outer two of said tape guides each configured to allow translation of a magnetic tape between an associated magnetic tape reel and said tape guide, said at least two outer tape guides each configured for rotation about a central axis, comprising:
   a cylindrical barrel having a cylindrical peripheral surface parallel to said central axis; and
   guide flanges substantially at each outer side of said cylindrical barrel and having a frusto-conical surface, said frusto-conical surface configured at a taper angle outward with respect to the perpendicular direction from said cylindrical surface; said taper angle of said guide flange substantially at an angle such that the angle at which a tapered tangential line extends from the circumference of said cylindrical peripheral surface of said cylindrical barrel and along the taper of said guide flange, to the maximum periphery of said frusto-conical surface, is at the maximum potential angle of attack from a magnetic tape at said associated magnetic tape reel with respect to said guide flange.

5. The tape translation system of claim 4, wherein said taper angle of each of said at least two outer tape guides is determined in accordance with the formula "arctan($H/(r_f-r)$)", where:
   $H = h \tan(\beta)$;
   $r_f$ = radius of said guide flange;
   $r$ = radius of said cylindrical peripheral surface of said cylindrical barrel;
   $h$ = length of said tapered tangential line; and
   $\beta$ = said maximum angle of attack from said associated magnetic tape reel with respect to said guide flange.

6. The tape translation system of claim 4, wherein said taper angle of each of said at least two outer tape guides is substantially between 1 degree and 2 degrees from said perpendicular direction.

7. A magnetic tape head system configured to read and/or write magnetic signals with respect to a magnetic tape, comprising:
   a magnetic tape head configured to read and/or write magnetic signals with respect to a magnetic tape that is translated across said magnetic tape head; and
   a plurality of rotatable tape guides positioned in a longitudinal direction of said magnetic tape, at least an outer two of said tape guides positioned at either side of said magnetic tape head in said longitudinal direction of said magnetic tape, said at least two outer tape guides configured to translate said magnetic tape across said magnetic tape head in said longitudinal direction of said magnetic tape and each between an associated magnetic tape reel and said tape guide, said at least two outer tape guides each configured for rotation about a central axis, comprising:
   a cylindrical barrel having a cylindrical peripheral surface parallel to said central axis; and
   a guide flange substantially at each outer side of said cylindrical barrel and having a frusto-conical surface, said frusto-conical surface configured at a taper angle outward with respect to the perpendicular direction from said cylindrical surface; said taper angle of said guide flange substantially at an angle such that the angle at which a tapered tangential line extends from the circumference of said cylindrical peripheral surface of said cylindrical barrel and along the taper of said guide flange, to the maximum periphery of said frusto-conical surface, is at the maximum potential angle of attack from a magnetic tape at said associated magnetic tape reel with respect to said guide flange.

8. The magnetic tape head system of claim 7, wherein said taper angle of each of said at least two outer tape guides is determined in accordance with the formula "arctan($H/(r_f-r)$)", where:
   $H = h \tan(\beta)$;
   $r_f$ = radius of said guide flange;
   $r$ = radius of said cylindrical peripheral surface of said cylindrical barrel;
   $h$ = length of said tapered tangential line; and β=said maximum angle of attack from said associated magnetic tape reel with respect to said guide flange.

9. The magnetic tape head system of claim 7, wherein said taper angle of each of said at least two outer tape guides is substantially between 1 degree and 2 degrees from said perpendicular direction.

10. A magnetic tape drive system configured to translate a magnetic tape in a longitudinal direction along a tape path across a magnetic tape head, comprising:
   a magnetic tape drive system configured to rotate magnetic tape reels to translate a magnetic tape in a longitudinal direction along said tape path; and
   a plurality of rotatable tape guides positioned in a longitudinal direction of said magnetic tape along said tape path, at least an outer two of said tape guides positioned at either side of said magnetic tape head in said longitudinal direction of said magnetic tape, said at least two outer tape guides configured to translate said magnetic tape across said magnetic tape head in said longitudinal direction of said magnetic tape and between an associated said magnetic tape reel and said tape guide, said at least two outer tape guides each configured for rotation about a central axis, comprising:
   a cylindrical barrel having a cylindrical peripheral surface parallel to said central axis; and
   a guide flange substantially at each outer side of said cylindrical barrel and having a frusto-conical surface, said frusto-conical surface configured at a taper angle outward with respect to the perpendicular direction from said cylindrical surface; said taper angle of said guide flange substantially at an angle such that the angle at which a tapered tangential line extends from the circumference of said cylindrical peripheral surface of said cylindrical barrel and along the taper of said guide flange, to the maximum periphery of said frusto-conical surface, is at the maximum potential angle of attack from a magnetic tape at said associated magnetic tape reel with respect to said guide flange.

11. The magnetic tape drive system of claim 10, wherein said taper angle of each of said at least two outer tape guides is determined in accordance with the formula "arctan(H/($r_f$−r))", where:
   H=h tan (β);
   $r_f$=radius of said guide flange;
   r=radius of said cylindrical peripheral surface of said cylindrical barrel;
   h=length of said tapered tangential line; and
   β=said maximum angle of attack from said associated magnetic tape reel with respect to said guide flange.

12. The magnetic tape drive system of claim 10, wherein said taper angle of each of said at least two outer tape guides is substantially between 1 degree and 2 degrees from said perpendicular direction.

* * * * *